US010643332B2

United States Patent
Hever et al.

(10) Patent No.: US 10,643,332 B2
(45) Date of Patent: May 5, 2020

(54) METHOD OF VEHICLE IMAGE COMPARISON AND SYSTEM THEREOF

(71) Applicant: UVeye Ltd., Tel-Aviv (IL)

(72) Inventors: Amir Hever, Tel-Aviv (IL); Ohad Hever, Modiin (IL); Ilya Bogomolny, Tel-Aviv (IL)

(73) Assignee: UVEYE LTD., Tel-Aviv (IL)

( * ) Notice: Subject to any disclaimer, the term of this patent is extended or adjusted under 35 U.S.C. 154(b) by 155 days.

(21) Appl. No.: 15/940,142

(22) Filed: Mar. 29, 2018

(65) Prior Publication Data

US 2019/0304099 A1   Oct. 3, 2019

(51) Int. Cl.
*G06K 9/34* (2006.01)
*G06T 7/174* (2017.01)
*G06T 7/143* (2017.01)
*G06K 9/32* (2006.01)

(52) U.S. Cl.
CPC ............ *G06T 7/174* (2017.01); *G06K 9/3233* (2013.01); *G06T 7/143* (2017.01); *G06K 2209/23* (2013.01); *G06T 2207/20081* (2013.01); *G06T 2207/20084* (2013.01); *G06T 2207/30248* (2013.01)

(58) Field of Classification Search
None
See application file for complete search history.

(56) References Cited

U.S. PATENT DOCUMENTS

| 6,047,083 A * | 4/2000 | Mizuno .............. G01N 23/2251 382/141 |
| 7,130,453 B2 * | 10/2006 | Kondo .............. G06K 9/00604 382/117 |
| 7,813,558 B2 * | 10/2010 | Hatabu ................ G06K 9/6203 382/209 |
| 8,019,164 B2 * | 9/2011 | Taguchi ................. G06K 9/685 382/141 |

(Continued)

FOREIGN PATENT DOCUMENTS

| CN | 106127747 A | 11/2016 |
| EP | 2911112 A1 | 8/2015 |
| WO | 2012012576 A1 | 1/2012 |

OTHER PUBLICATIONS

Nvidia GTC Conference 2017, Oct. 18, 2017.

*Primary Examiner* — Feng Niu
(74) *Attorney, Agent, or Firm* — Browdy and Neimark, PLLC

(57) ABSTRACT

There are provided a system and method of vehicle image comparison, the method including: obtaining an input image comprising a plurality of image portions; retrieving a set of reference images; for each image portion, searching for a best matching reference portion in the set of reference images, comprising: i) for each given reference image: identifying a reference region; using a similarity model on the given image portion and the reference region to obtain a similarity map indicating a similarity between the image portion and a respective reference image portion; and selecting a reference image portion with the best similarity as a (Continued)

reference portion candidate; and ii) selecting the best matching reference portion; and comparing each given image portion with the best matching reference portion using a comparison model, giving rise to a difference map indicating probability of presence of DOI in the given image portion.

31 Claims, 6 Drawing Sheets

(56) References Cited

U.S. PATENT DOCUMENTS

| | | | | |
|---|---|---|---|---|
| 9,153,079 B1* | 10/2015 | Wood | | G07C 5/0808 |
| 9,232,118 B1* | 1/2016 | Mogre | | H04N 5/21 |
| 9,292,929 B2* | 3/2016 | Hayata | | G06T 7/11 |
| 9,773,196 B2* | 9/2017 | Sachs | | G06K 9/00228 |
| 9,846,930 B2* | 12/2017 | Wu | | G06T 7/001 |
| 10,007,020 B2* | 6/2018 | Li | | G01V 5/0008 |
| 10,043,090 B2* | 8/2018 | Tanaka | | G06K 9/46 |
| 10,127,458 B2* | 11/2018 | Singh | | G06K 9/00785 |
| 10,255,526 B2* | 4/2019 | Gandenberger | | G06K 9/0063 |
| 10,282,843 B2* | 5/2019 | Abedini | | A61B 5/6898 |
| 10,311,561 B2* | 6/2019 | Ukishima | | G06K 9/6202 |
| 10,445,891 B2* | 10/2019 | Wyeth | | A61B 6/5229 |
| 2003/0058435 A1* | 3/2003 | Honda | | G01N 21/9501 |
| | | | | 356/237.1 |
| 2003/0118217 A1* | 6/2003 | Kondo | | G06K 9/00604 |
| | | | | 382/117 |
| 2004/0057629 A1* | 3/2004 | Shikami | | G01N 21/8851 |
| | | | | 382/254 |
| 2006/0132291 A1* | 6/2006 | Dourney, Jr. | | G06Q 99/00 |
| | | | | 340/286.01 |
| 2006/0171593 A1* | 8/2006 | Hayakawa | | G06T 7/001 |
| | | | | 382/209 |
| 2007/0250232 A1* | 10/2007 | Dourney, Jr. | | G06Q 99/00 |
| | | | | 701/33.4 |
| 2008/0136625 A1* | 6/2008 | Chew | | G01V 5/0008 |
| | | | | 340/540 |
| 2008/0205769 A1* | 8/2008 | Taguchi | | G06K 9/6202 |
| | | | | 382/209 |
| 2008/0273800 A1* | 11/2008 | Hatabu | | G06K 9/6203 |
| | | | | 382/209 |
| 2013/0188878 A1* | 7/2013 | Kacenjar | | G06T 3/0068 |
| | | | | 382/209 |
| 2014/0105498 A1* | 4/2014 | Sethuraman | | G06T 7/20 |
| | | | | 382/180 |
| 2014/0226905 A1* | 8/2014 | Yahata | | G06T 5/20 |
| | | | | 382/194 |
| 2015/0269792 A1 | 9/2015 | Wood | | |
| 2015/0294182 A1* | 10/2015 | Kenig | | G06T 5/50 |
| | | | | 382/132 |
| 2016/0178790 A1 | 6/2016 | Li et al. | | |
| 2017/0091925 A1* | 3/2017 | Wu | | G06T 7/001 |
| 2017/0154234 A1 | 6/2017 | Tanaka | | |
| 2017/0213112 A1 | 7/2017 | Sach et al. | | |
| 2017/0293894 A1 | 10/2017 | Taliwal et al. | | |
| 2017/0344835 A1* | 11/2017 | Singh | | G06K 9/00785 |
| 2017/0359534 A1* | 12/2017 | Li | | H04N 5/2258 |
| 2017/0372155 A1* | 12/2017 | Odry | | G06K 9/03 |
| 2018/0096472 A1* | 4/2018 | Ukishima | | G06K 9/6202 |
| 2018/0122076 A1* | 5/2018 | Abedini | | A61B 5/6898 |
| 2018/0225800 A1* | 8/2018 | Wang | | G06T 1/0021 |
| 2018/0240194 A1* | 8/2018 | Dong | | G06Q 30/0185 |
| 2018/0357517 A1* | 12/2018 | Gandenberger | | G06K 9/0063 |
| 2019/0005361 A1* | 1/2019 | Cho | | G06K 9/6277 |
| 2019/0139238 A1* | 5/2019 | Wyeth | | G06T 7/35 |
| 2019/0205606 A1* | 7/2019 | Zhou | | G06K 9/0014 |

* cited by examiner

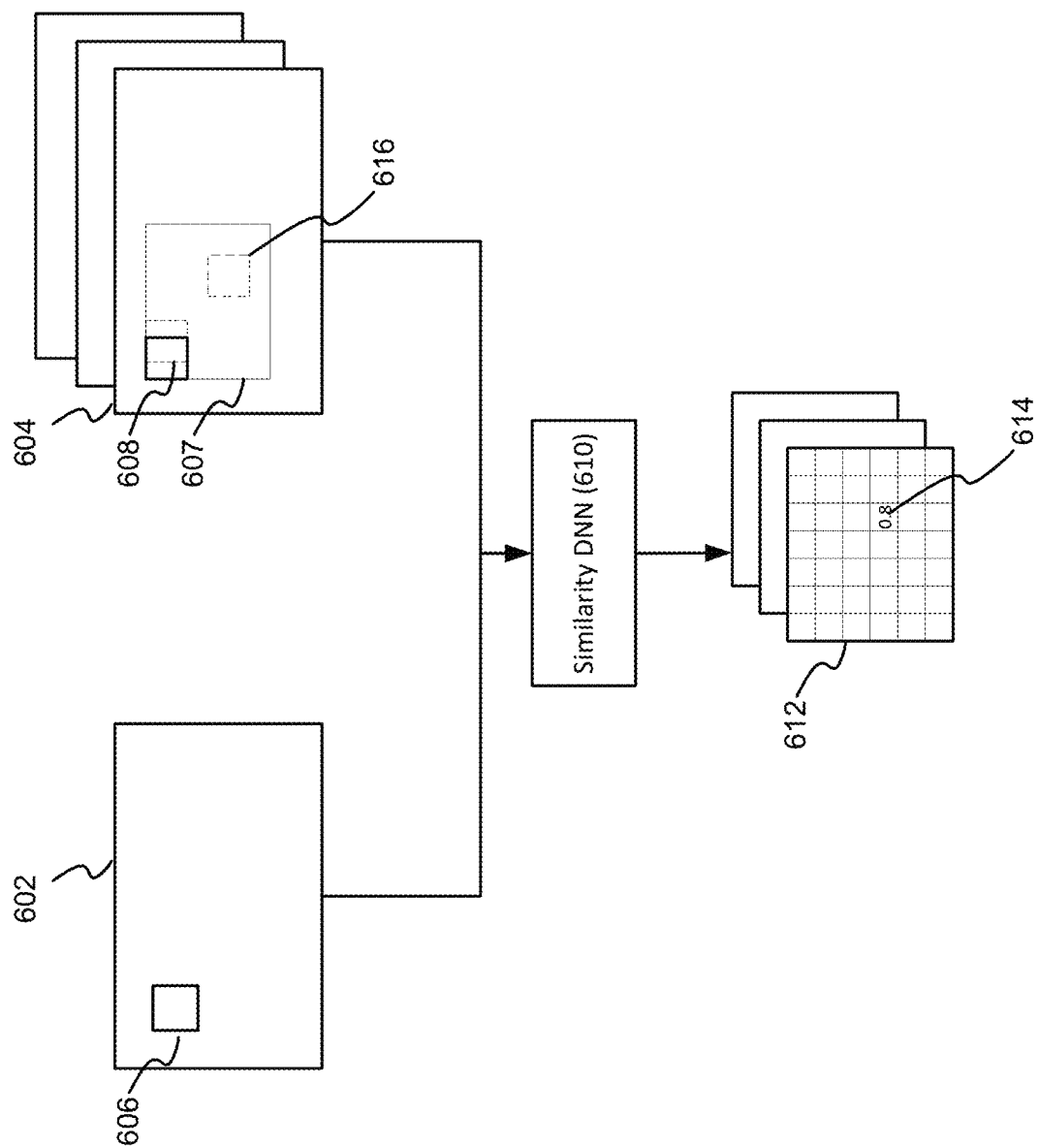

METHOD OF VEHICLE IMAGE COMPARISON AND SYSTEM THEREOF

TECHNICAL FIELD

The presently disclosed subject matter relates, in general, to the field of vehicle image analysis, and more specifically, to methods and systems for vehicle image comparison.

BACKGROUND

Inspection of a motor vehicle is commonly performed manually by a technician. Images of a vehicle are sometimes captured for the purpose of assisting the manual inspection process and providing visual evidence of the inspection. This process is usually cumbersome and time-consuming.

In some cases, vehicle images are captured and analyzed for inspection purposes. Image registration is commonly used when analyzing an image with respect to a reference image. Known methods in this aspect are generally inefficient, error-prone and computationally costly.

GENERAL DESCRIPTION

In accordance with certain aspects of the presently disclosed subject matter, there is provided a computerized method of vehicle image comparison, comprising: obtaining an input image acquired by an imaging device capturing at least part of a vehicle, the input image comprising a plurality of image portions; retrieving a set of reference images; for each given image portion of the plurality of image portions, searching for a best matching reference portion in the set of reference images, comprising: i) obtaining a set of reference portion candidates corresponding to the set of reference images, comprising, for each given reference image within the set: identifying a reference region in the given reference image according to location of the given image portion within the input image, the reference region having a size that is not smaller than the given image portion; using a similarity model on the given image portion and the reference region to obtain a similarity map comprising one or more sections corresponding to one or more reference image portions with one or more respective locations within the reference region, each section in the similarity map indicating a similarity between the given image portion and a respective reference image portion; and selecting, from the one or more reference image portions, a reference image portion with the best similarity as a reference portion candidate for the given reference image; and ii) selecting the best matching reference portion from the set of reference portion candidates; and comparing each given image portion with the best matching reference portion using a comparison model, giving rise to a difference map corresponding to the given image portion, the difference map indicating probability of presence of difference of interest (DOI) in the given image portion, thereby obtaining a plurality of difference maps corresponding to the plurality of image portions of the input image.

In addition to the above features, the method according to this aspect of the presently disclosed subject matter can comprise one or more of features (i) to (xiv) listed below, in any desired combination or permutation which is technically possible:

(i). The method can further comprise combining the plurality of difference maps to a composite difference map indicating probability of presence of difference of interest (DOI) in the input image.

(ii). The plurality of image portions can be obtained using a sliding window.

(iii). The plurality of image portions can be obtained by segmenting the input image into one or more input segments corresponding to one or more mechanical components comprised in the at least part of the vehicle using a segmentation model.

(iv). The input image can be acquired by the imaging device at a first imaging condition, and at least one reference image within the set of reference images can be acquired at a second imaging condition different from the first imaging condition, thereby causing false alarm (FA) difference between the input image and the at least one reference image resulting from difference between the first and second imaging conditions.

(v). The first and second imaging conditions can comprise one or more of the following: relative position between the vehicle and the imaging device, illumination condition, and speed of the vehicle.

(vi). The set of reference images can be retrieved using an instance descriptor uniquely identifying the vehicle in the input image.

(vii). The set of reference images can be selected from a group comprising: a first set of images capturing the same instance of the vehicle, and a second set of images capturing similar instances to the vehicle.

(viii). The second set of images can be selected by using an encoding model to obtain vector representation for each of the input image and candidate reference images, and selecting the second set of images using a similarity metric between the vector representation of the input image and each candidate reference image.

(ix). The comparison model can be a comparison deep learning model trained using a training dataset comprising a set of image pairs each including a target image and a reference image so as to be capable of identifying the DOI and excluding the FA difference in a difference map between each image pair.

(x). The similarity model can be a similarity deep learning model trained using a training dataset comprising a plurality of sets of image portions extracted from registered images, and the similarity model is trained so as to reflect similarity within each pair of image portions within each set of the plurality of sets of image portions.

(xi). The segmentation model can be a segmentation deep learning model trained using a training dataset comprising a set of pre-segmented vehicle images according to mechanical components comprised therein.

(xii). The difference map corresponding to the given image portion can indicate portion-wise probability of presence of DOI in the given image portion.

(xiii). The difference map corresponding to the given image portion can indicate pixel-wise probability of presence of DOI in the given image portion.

(xiv). At least some of the pixels in the composite difference map can result from comparisons with different reference images.

In accordance with other aspects of the presently disclosed subject matter, there is provided a computerized system of vehicle image comparison, the system comprising a processor and memory circuitry (PMC) operatively connected to an I/O interface, wherein: the I/O interface is configured to obtain an input image acquired by an imaging device capturing at least part of a vehicle, the input image comprising a plurality of image portions, and retrieve a set of reference images; and the PMC is configured to: for each given image portion of the plurality of image portions, search for a best matching reference portion in the set of reference images, comprising: i) obtaining a set of reference portion candidates corresponding to the set of reference images, comprising, for each given reference image within the set: identifying a reference region in the given reference image according to location of the given image portion within the input image, the reference region having a size that is not smaller than the given image portion; using a similarity model on the given image portion and the reference region to obtain a similarity map comprising one or more sections corresponding to one or more reference image portions with one or more respective locations within the reference region, each section in the similarity map indicating a similarity between the given image portion and a respective reference image portion; and selecting, from the one or more reference image portions, a reference image portion with the best similarity as a reference portion candidate for the given reference image; and ii) selecting the best matching reference portion from the set of reference portion candidates; and compare each given image portion with the best matching reference portion using a comparison model, giving rise to a difference map corresponding to the given image portion, the difference map indicating probability of presence of difference of interest (DOI) in the given image portion, thereby obtaining a plurality of difference maps corresponding to the plurality of image portions of the input image.

This aspect of the disclosed subject matter can comprise one or more of features (i) to (xiv) listed above with respect to the method, mutatis mutandis, in any desired combination or permutation which is technically possible.

In accordance with other aspects of the presently disclosed subject matter, there is provided a non-transitory computer readable storage medium tangibly embodying a program of instructions that, when executed by a computer, cause the computer to perform a method of vehicle image comparison, the method comprising: obtaining an input image acquired by an imaging device capturing at least part of a vehicle, the input image comprising a plurality of image portions; retrieving a set of reference images; for each given image portion of the plurality of image portions, searching for a best matching reference portion in the set of reference images, comprising: i) obtaining a set of reference portion candidates corresponding to the set of reference images, comprising, for each given reference image within the set: identifying a reference region in the given reference image according to location of the given image portion within the input image, the reference region having a size that is not smaller than the given image portion; using a similarity model on the given image portion and the reference region to obtain a similarity map comprising one or more sections corresponding to one or more reference image portions with one or more respective locations within the reference region, each section in the similarity map indicating a similarity between the given image portion and a respective reference image portion; and selecting, from the one or more reference image portions, a reference image portion with the best similarity as a reference portion candidate for the given reference image; and ii) selecting the best matching reference portion from the set of reference portion candidates; and comparing each given image portion with the best matching reference portion using a comparison model, giving rise to a difference map corresponding to the given image portion, the difference map indicating probability of presence of difference of interest (DOI) in the given image portion, thereby obtaining a plurality of difference maps corresponding to the plurality of image portions of the input image.

This aspect of the disclosed subject matter can comprise one or more of features (i) to (xiv) listed above with respect to the method, mutatis mutandis, in any desired combination or permutation which is technically possible.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 6 illustrates a schematic example of selecting the best matching reference portion for a given image portion in an input image in accordance with certain embodiments of the presently disclosed subject matter.

DETAILED DESCRIPTION OF EMBODIMENTS

Figure 1:
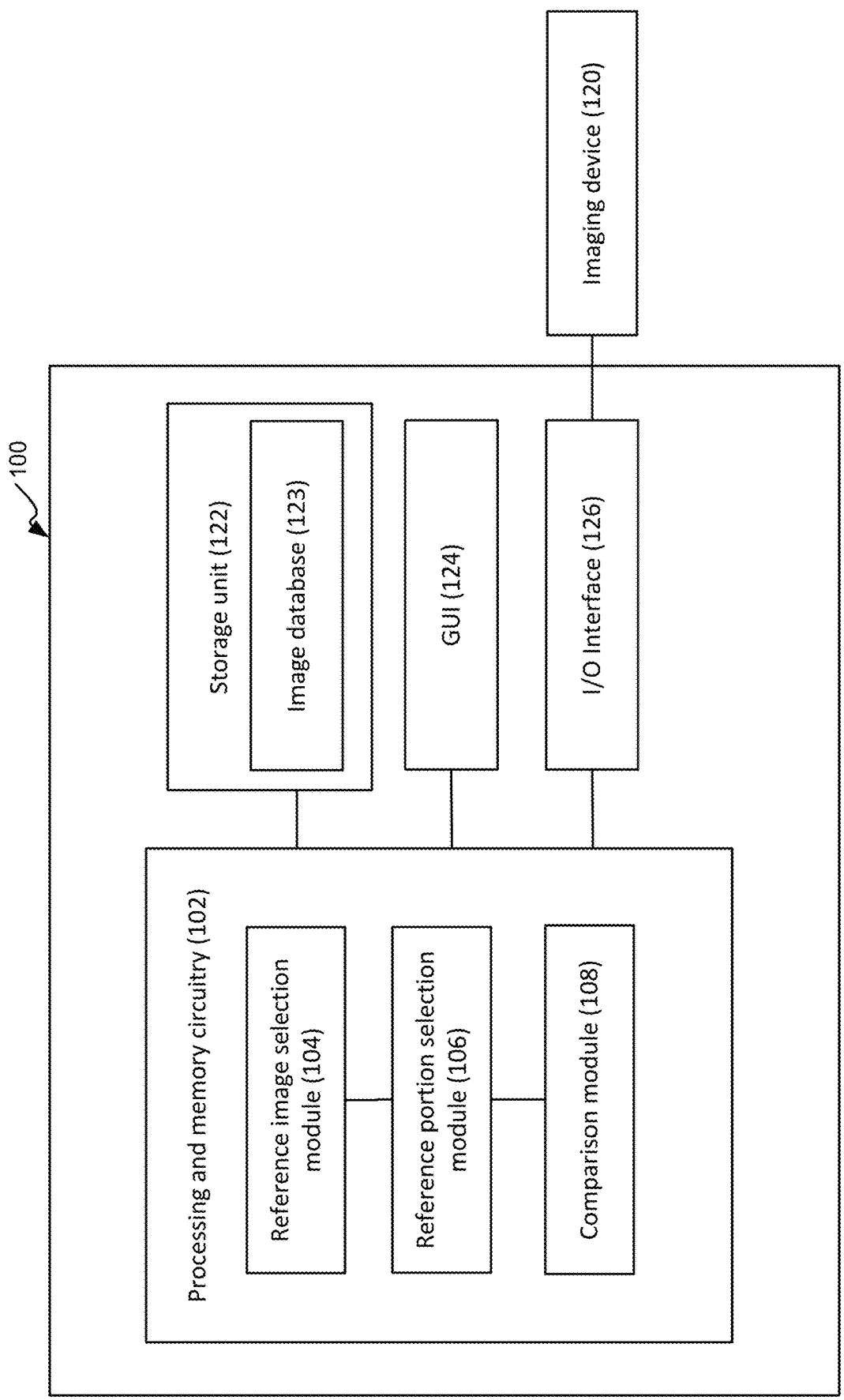
FIG. 1 schematically illustrates a block diagram of a computerized system capable of comparing vehicle images in accordance with certain embodiments of the presently disclosed subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "obtaining", "comparing", "retrieving", "capturing", "segmenting", "generating", "using", "retrieving", "providing", "combining", "identifying", "causing", "encoding", "selecting", "training", "excluding", "searching", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the vehicle image comparison system and the processing and memory circuitry (PMC) thereof disclosed in the present application.

The operations in accordance with the teachings herein can be performed by a computer specially constructed for the desired purposes or by a general purpose computer specially configured for the desired purpose by a computer program stored in a non-transitory computer readable storage medium.

The terms "non-transitory memory", "non-transitory storage medium" and "non-transitory computer readable storage medium" used herein should be expansively construed to cover any volatile or non-volatile computer memory suitable to the presently disclosed subject matter.

Embodiments of the presently disclosed subject matter are not described with reference to any particular programming language. It will be appreciated that a variety of programming languages may be used to implement the teachings of the presently disclosed subject matter as described herein.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

In embodiments of the presently disclosed subject matter one or more stages illustrated in the figures may be executed in a different order and/or one or more groups of stages may be executed simultaneously and vice versa.

Bearing this in mind, attention is drawn to FIG. 1, schematically illustrating a block diagram of a computerized system capable of comparing vehicle images in accordance with certain embodiments of the presently disclosed subject matter.

The system 100 illustrated in FIG. 1 is a computer-based vehicle image comparison system. System 100 can be configured to obtain, via a hardware-based I/O interface 120, an input image (also termed as target image) acquired by an imaging device 120. The input image captures at least part of a vehicle. It is to be noted that the term "vehicle" used herein should be expansively construed to cover any kind of motor vehicle including but not limited to cars, buses, motorcycles, trucks, trains, and airplanes, etc. The present disclosure is not limited by the type and usage of a specific vehicle, nor by the state of the vehicle being either static or in motion.

The imaging device 120 can be any kind of image acquisition device(s) or general-purpose device(s) equipped with image acquisition functionalities that can be used to capture vehicle images at a certain resolution and frequency, such as, e.g., a digital camera with image and/or video recording functionalities. In some embodiments, the imaging device can refer to one image acquisition device that is located at a given relative position with respect to the vehicle. The input image can refer to one or more images captured by the given image acquisition device from a given perspective. In some embodiments, the imaging device can refer to a plurality of imaging acquisition units which can be located at different relative positions with respect to the vehicle so as to capture input images from different perspectives. In such cases, the input image should be understood as referring to one or more images acquired by each or at least some of the plurality of imaging acquisition units, as will be described in further detail below with reference to FIG. 2.

As illustrated, system 100 can comprise a processing and memory circuitry (PMC) 102 operatively connected to the I/O interface 126 and a storage unit 122. PMC 102 is configured to provide all processing necessary for operating system 100 which is further detailed with reference to FIGS. 2-3. PMC 102 comprises a processor (not shown separately) and a memory (not shown separately). The processor of PMC 102 can be configured to execute several functional modules in accordance with computer-readable instructions implemented on a non-transitory computer-readable memory comprised in the PMC. Such functional modules are referred to hereinafter as comprised in the PMC. It is to be noted that the term processor referred to herein should be expansively construed to cover any processing circuitry with data processing capabilities, and the present disclosure is not limited to the type or platform thereof, or number of processing cores comprised therein. In some cases, system 100 can be operatively connected to one or more external data repositories (not shown separately).

The storage unit 122 can include an image database 123 which can be configured to store multiple previous scans/images of vehicle instances which can be previously processed (e.g., segmented). Certain images can be selected therefrom as reference images which can be retrieved by the PMC 102 for purpose of comparison with an input image. Optionally, the image database can reside external to system 100, e.g., in one of the external data repositories, or in an external system or provider, and the reference images can be retrieved via the I/O interface 120. In some cases, the input image can be pre-acquired and stored in the image database 123 which can be retrieved by the PMC.

In certain embodiments, functional modules comprised in the PMC 102 can comprise a reference image selection module 104, a reference portion selection module 106, and a comparison module 108. The functional modules comprised in the PMC are operatively connected with each other. The reference image selection module 104 can be configured to select, from the image database, the set of reference images to be retrieved for the comparison with respect to a given input image, as will be described in further detail below with reference to FIG. 3. The input image can comprise a plurality of image portions. The reference portion selection module 106 can be configured to, for each given image portion of the plurality of image portions, search for a best matching reference portion in the set of reference images, as detailed below with reference to FIG. 2.

The comparison module 108 can be configured to compare each given image portion with the best matching reference portion using a comparison model, giving rise to a difference map corresponding to the given image portion. The difference map can indicate probability of presence of difference of interest (DOI) in the given image portion. Therefore a plurality of difference maps corresponding to the plurality of image portions of the input image can be obtained. Details of the reference portion selection and comparison are described below in further detail with reference to FIG. 2.

The I/O interface 120 can be configured to obtain, as input, the input image from the imaging device and/or the reference images from image database/data repository, and provide, as output, a plurality of difference maps corresponding to the plurality of image portions of the input image indicating probability of presence of DOI therein. Optionally, system 100 can further comprise a graphical user interface (GUI) 124 configured to render display of the input and/or the output to the user. Optionally, the GUI can be configured to enable user-specified inputs for operating system 100.

System 100 can be used for vehicle image comparison for various purposes and applications, such as, e.g., inspection and detection for anomalies, regular checkup and maintenance, etc. By way of example, for security purposes, system 100 can be used for detection of any illegal contraband, potential explosive and any visible mechanical modification to the vehicle. By way of another example, for general automotive purposes, system 100 can be used for detection of, e.g., rust, oil leakage, missing parts, change in tire condition, and any mechanical damages, such as dents, scratches etc. These comparison and detection applications can be done either with respect to previous scans of the same vehicle, or scans of similar vehicles (as described with reference to FIG. 3). It is to be appreciated that the present disclosure is not limited by any specific usage of the system.

When comparing an input image of a vehicle to any of previous references, there can be two types of differences appearing in the comparison result (e.g., represented by a difference map). One type of difference is the DOI difference which reflects real physical changes of the vehicle itself (as compared to the reference), such as, e.g., damages, anomalies, un-matching components, color changes, etc. The other type of difference refers to a false alarm (FA) difference which is not indicative of any real change of the vehicle but rather results from the fact that the two images (i.e., the input image and the reference image) are acquired under different imaging conditions. Imaging conditions that may cause FA type of differences can include one or more of the following: relative position between the vehicle and the imaging device, illumination condition, speed of the vehicle, and added spots (e.g., dirt) on the imaging device, etc.

By way of example, in cases where the imaging device is an underground camera that takes vehicle undercarriage images, it is possible that the input image and the reference image are taken when the vehicle passes the camera at two different relative positions (e.g., the first time the vehicle may pass slightly towards the right side of the camera, as compared to the second time), and/or at different speeds, such that the acquired images capture the undercarriage differently (e.g., the same component may look different in the two images in terms of dimension, scale, shape, etc., due to the images being taken from different angles/perspectives, and/or a certain component/object may be revealed in one image but not in the other, etc.). By way of another example, different illumination conditions under which the two images are taken may result in different brightness of the same components in the two images therefore affecting the comparison result. Thus, vehicle image comparison may impose many technical challenges as compared to comparison of other types of images, due to the above described factors.

One goal of the comparison as presently disclosed herein, is to be able to identify the DOI type of differences while excluding the FA differences in the comparison result. As aforementioned, image registration is commonly used in image analysis and comparison. However, known image registration techniques are rather cumbersome and cannot properly solve the above mentioned specific problems as caused in the specific case of vehicle image comparison. For instance, the known image registration technique may not work properly in these cases since the same vehicle component may look very different in two images, and thus may not be properly matched/registered.

By performing reference portion selection and comparison as will be described with reference to FIG. 2 below, and optionally a reference image selection process as will be described with reference to FIG. 3 below, a more efficient comparison process with better comparison results (i.e., in terms of identifying DOI while excluding FA differences) can be achieved.

It is also noted that the system illustrated in FIG. 1 can be implemented in a distributed computing environment, in which the aforementioned functional modules shown in FIG. 1 can be distributed over several local and/or remote devices, and can be linked through a communication network.

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and hardware. The system in FIG. 1 can be a standalone network entity, or integrated, fully or partly, with other network entities. Those skilled in the art will also readily appreciate that the data repositories or storage unit therein can be shared with other systems or be provided by other systems, including third party equipment.

Figure 2:
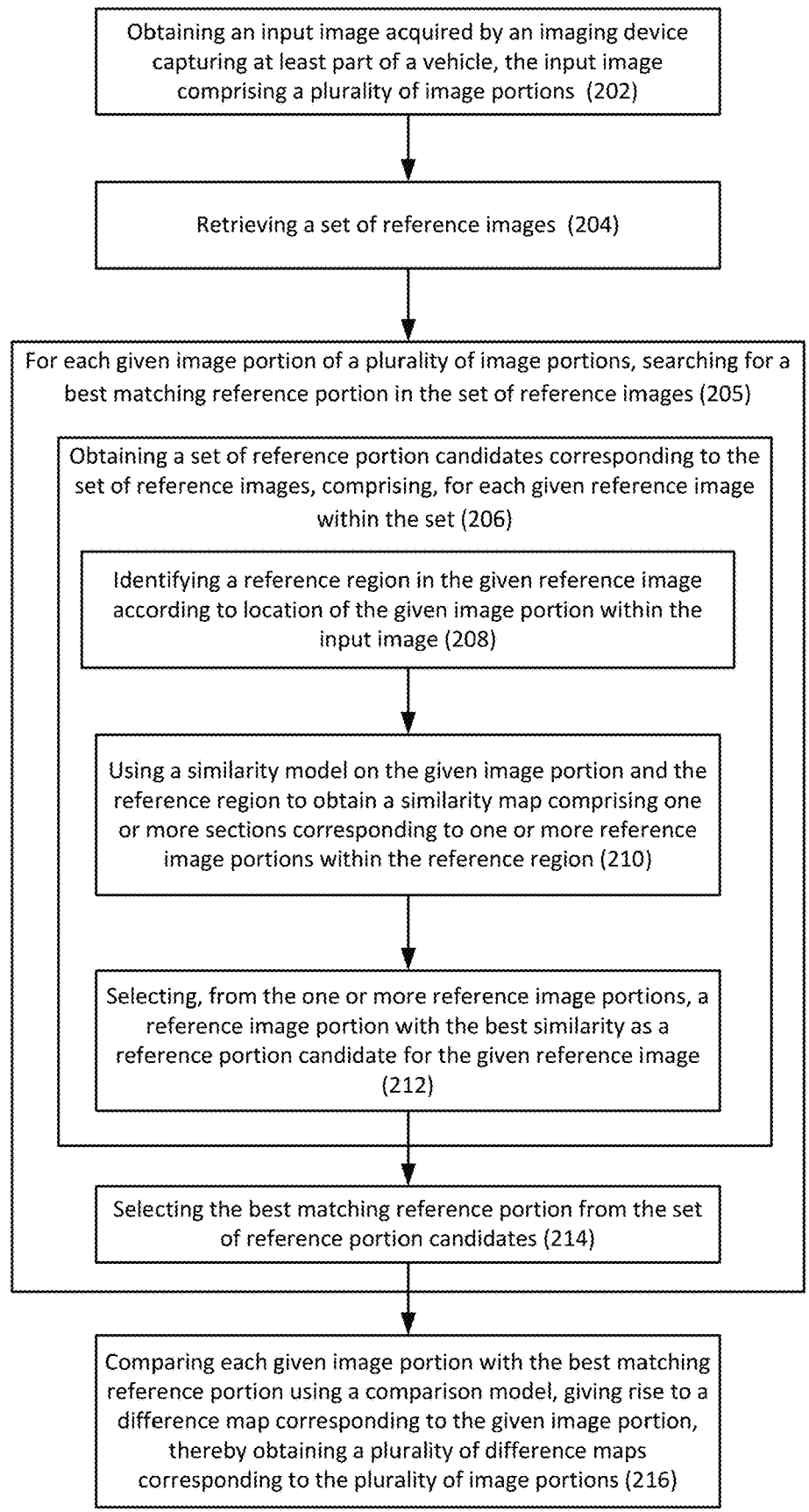
FIG. 2 illustrates a generalized flowchart of vehicle image comparison in accordance with certain embodiments of the presently disclosed subject matter.
Figure 3:
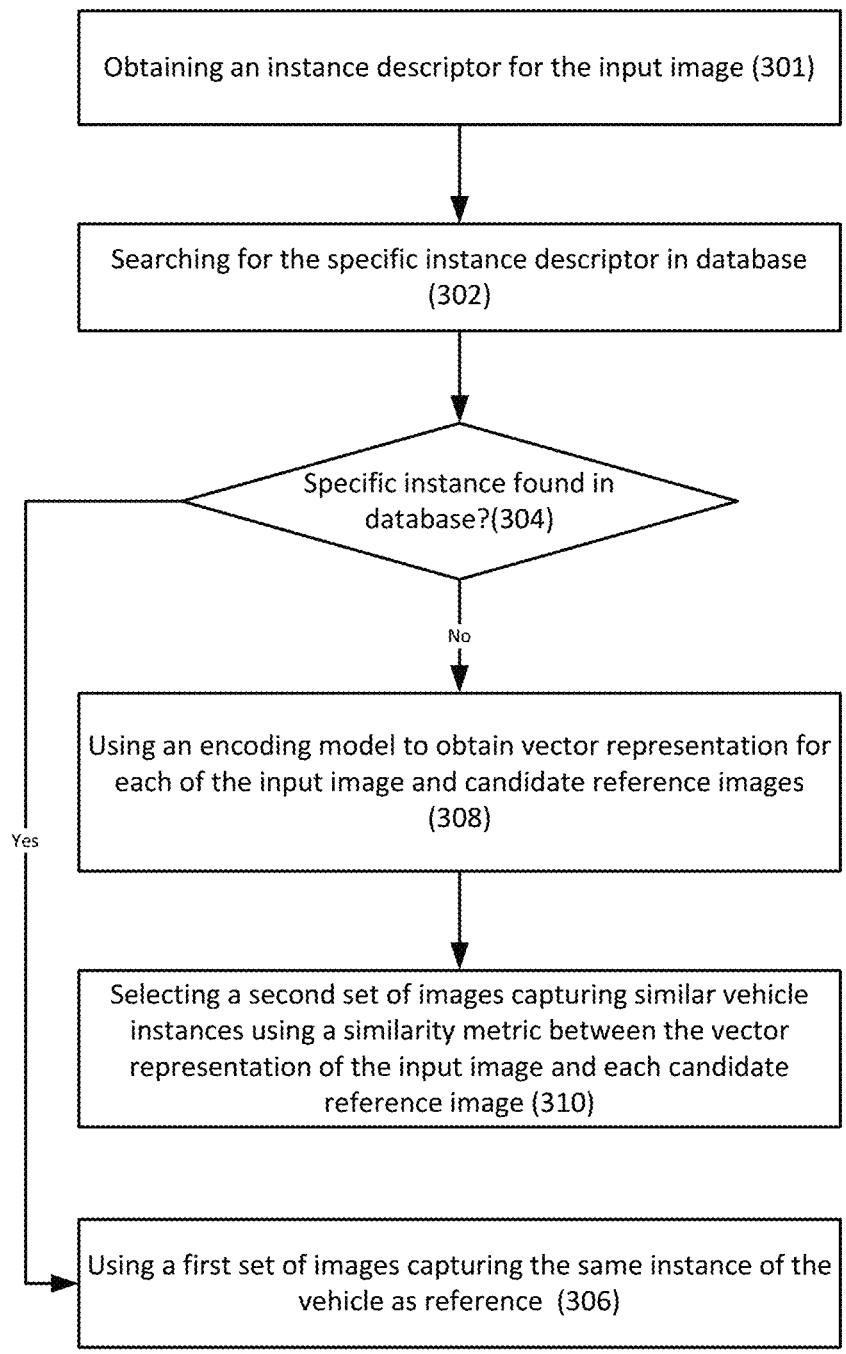
FIG. 3 illustrates a generalized flowchart of reference selection in accordance with certain embodiments of the presently disclosed subject matter.

While not necessarily so, the process of operation of system 100 can correspond to some or all of the stages of the methods described with respect to FIGS. 2-3. Likewise, the methods described with respect to FIGS. 2-3 and their possible implementations can be implemented by system 100. It is therefore noted that embodiments discussed in relation to the methods described with respect to FIGS. 2-3 can also be implemented, mutatis mutandis as various embodiments of the system 100, and vice versa.

Referring now to FIG. 2, there is illustrated a generalized flowchart of vehicle image comparison in accordance with certain embodiments of the presently disclosed subject matter.

An input image acquired by an imaging device can be obtained (e.g., by the PMC 102 via I/O interface 126, or from the image database 123, as illustrated in FIG. 1). The input image can capture at least part of a vehicle.

The term "input image" or "target image" used herein should be expansively construed to refer to any of the following: one or more still images acquired from one or more perspectives, sequence/series of images/frames acquired from a given perspective constituting video(s), and stitched/composite image(s) generated based on any of the above.

As aforementioned, in some embodiments, the input image can refer to one or more images captured by one image acquisition device from a given perspective/view/angle, such as, e.g., front, side (e.g., either left or right side), rear, top, and underside of a vehicle. The input image can therefore cover at least part of the vehicle's exterior, depending on the specific perspective that the images are taken from, and the relative position between the image acquisition device and the vehicle. By way of example, an imaging device that is embedded underground a passage that a vehicle passes by, can capture multiple undercarriage images at a given time interval (e.g., 100-250 frames per second). The multiple undercarriage images with overlapping field of view can be combined together to form a single stitched image of the vehicle undercarriage. Such a stitched image, which typically has a relatively high resolution, can be used as the input image. In some cases, such a stitched image can be a 3D image.

In some embodiments, the input image can refer to one or more images acquired by each of a plurality of imaging acquisition units located at different relative positions with respect to the vehicle. By way of example, still images can be acquired from different perspectives, and a composite image can be generated based on the multiple still images, which can be used as the input image to system 100. For instance, by using cameras surrounding the vehicle, a 3D vehicle model can be created and used as the input image. The 3D model, as well as the 3D image as mentioned above, can refer to a model or an image which contains additional information for each pixel indicating relative or absolute depth measure of the pixel with respect to the imaging device. In some cases, a 3D model or image can be created based on the captured 2D images, and one or more synthesized 2D images can be extracted from the 3D model or image. Such synthesized 2D images can be used as input for the comparison system 100 as disclosed herein rather than the captured 2D images. This can be advantageous in some cases for the purpose of compensating perspective differences (i.e., differences caused by point of view), since the synthesized 2D images can be generated from an estimated perspective that is closer/similar to the reference images, therefore enabling reducing the FA type differences.

Optionally, the functionality of generation of the stitched image or composite image as described above, or at least part thereof, can be integrated within the PMC 102. Alternatively, such functionality can be possibly provided by the imaging device, and the stitched image or composite image can be sent to the PMC via the I/O interface.

It is to be appreciated that the present disclosure is not limited by the number, type, coverage, and perspective of the input image as being taken nor by the specific generation methods thereof.

Upon obtaining the input image, a plurality of image portions can be derived therefrom. In one embodiment, the input image can be partitioned into the plurality of image portions by using a predefined grid. In another embodiment, the plurality of image portions can be obtained by using a sliding window. The sliding window can have a predefined size and can be configured to "slide" through within the input image with a certain step size (e.g., the distance that the sliding window moves per "slide" step). The step size can be defined so that the image portions are either not overlapped with each other or overlapped in a specific way. The present disclosure is not limited to any specific way to obtain the image portions.

In some embodiments, the plurality of image portions can be obtained by segmenting the input image (e.g., by a Segmentation module (not shown separately) in PMC 102) into one or more input segments corresponding to one or more mechanical components comprised in the at least part of the vehicle using a segmentation model. The input segments can be used as the image portions. It is to be noted that the partition of a vehicle or part thereof into mechanical components may vary, e.g., it is possible that a certain mechanical component can be further partitioned into sub-components. Thus it is to be appreciated that the correspondence/mapping between the image portions and mechanical components is not fixed and can be adapted accordingly. For instance, one image portion can correspond to one or more mechanical components, or alternatively, one mechanical component can correspond to one or more image portions. The present disclosure is not limited by the specific partition of mechanical components and/or the correspondence between the image portions and mechanical components.

Figure 4:
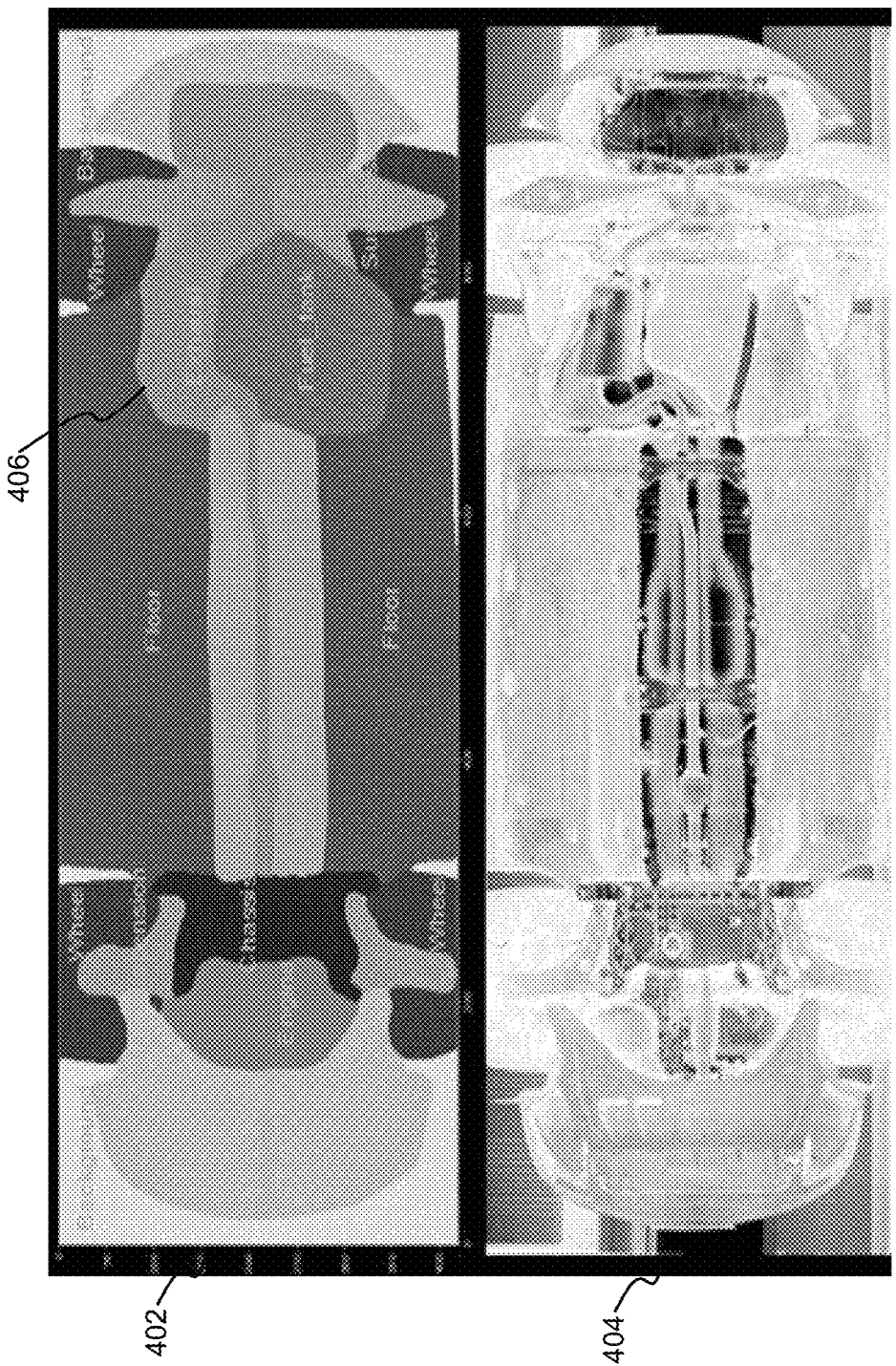
FIG. 4 illustrates an example of an input image and corresponding segments in accordance with certain embodiments of the presently disclosed subject matter.

FIG. 4 illustrates an example of an input image and corresponding segments in accordance with certain embodiments of the presently disclosed subject matter. As shown, the exemplary input image 404 captures the undercarriage of a vehicle. The input image 404 is segmented into multiple input segments as illustrated in 402. The segmentation is performed such that the segments in 402 correspond to the following exemplary mechanical components: exhaust, fuel tank, engine, wheel, suspension, and chassis, etc. Take the segment 406 for example, in the current example, there is one segment 406 corresponding to the entire exhaust component. However, in other cases, the exhaust can be further divided into sub-components/parts, such as, e.g., one or more exhaust pipes, and the segment(s) can correspond to the sub-components, or to the entire component.

In some embodiments, the segmentation model can be based on machine learning. By way of example, the segmentation model can be implemented as a segmentation deep learning model, such as, e.g., a deep learning neural network (also referred to as deep neural network, or DNN). The segmentation deep learning model can be deemed as being comprised in a Segmentation module of PMC 102.

DNN, as referred to herein, can refer to supervised or unsupervised DNN comprising a plurality of layers organized in accordance with respective DNN architecture. By way of not-limiting example, the layers of DNN can be organized in accordance with Convolutional Neural Network (CNN) architecture, Recurrent Neural Network architecture, Recursive Neural Networks architecture, GAN architecture or otherwise. Optionally, at least part of the layers can be organized in a plurality of DNN sub-networks. Each layer of DNN can include multiple basic computational elements (CE) typically referred to in the art as dimensions, neurons, or nodes.

Generally, CEs of a given layer can be connected with CEs of a preceding layer and/or a subsequent layer. Each connection between the CE of a preceding layer and the CE of a subsequent layer is associated with a weighting value. A given CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The given CE can be configured to compute an activation value (e.g. the weighted sum of the inputs) and further derive an output by applying an activation function to the computed activation. The activation function can be, for example, an identity function, a deterministic function (e.g., linear, sigmoid, threshold, or the like), a stochastic function or other suitable function. The output from the given CE can be transmitted to CEs of a subsequent layer via the respective connections. Likewise, as above, each connection at the output of a CE can be associated with a weighting value which can be applied to the output of the CE prior to being received as an input of a CE of a subsequent layer. Further to the weighting values, there can be threshold values (including limiting functions) associated with the connections and CEs.

The weighting and/or threshold values of a DNN can be initially selected prior to training, and can be further iteratively adjusted or modified during training to achieve an optimal set of weighting and/or threshold values in a trained DNN. After each iteration, a difference can be determined between the actual output produced by DNN and the target output associated with the respective training set of data. The difference can be referred to as an error value. Training can be determined to be complete when a cost function indicative of the error value is less than a predetermined value, or when a limited change in performance between iterations is achieved. Optionally, at least part of DNN subnetworks (if any) can be trained separately prior to training the entire DNN.

A set of DNN input data used to adjust the weights/thresholds of a deep neural network is referred to hereinafter as a training set or training dataset or training data.

It is noted that the teachings of the presently disclosed subject matter are not bound by the DNN architecture as described above.

In some embodiments, the segmentation deep learning model (e.g., the segmentation DNN) can be trained using a training dataset comprising a set of pre-segmented vehicle images according to mechanical components comprised therein. The training images are segmented and demarcated manually according to the mechanical component targets in the image, and the segmented labels are obtained. The training images and the segmented labels are input into the segmentation DNN for training. The training process is to optimize the model so that it can correctly predict segmentation label (e.g., pixel-wise segmentation label) of an input image. In some cases, different training datasets covering images of various types of vehicles need to be provided so as to train the model to be able to segment different types of incoming vehicles in runtime.

Continuing with the flow of FIG. 2, a set of reference images can be retrieved (206) (e.g., by the Reference image selection module 104 of the PMC 102).

Referring now to FIG. 3, there is illustrated a generalized flowchart of reference selection in accordance with certain embodiments of the presently disclosed subject matter.

The set of reference images are selected using an instance descriptor. The instance descriptor can be a unique identifier of a vehicle instance in an image. By way of example, the instance descriptor can be obtained/generated by using license plate recognition. By way of another example, a manual entry of a identifier can be used as an instance descriptor. In some cases, a fingerprint representative of specific features of the vehicle instance in the image can be created and used as the instance descriptor. By way of example, the specific features can refer to one or more structural characteristics of elements/components/patterns within the image, such as, e.g., shape, size, location of elements, and geometrical relations and relative positions between elements, etc. Additionally or alternatively, the location and time of the acquisition of the input image can also be used as part of the identifier information. Accordingly, a specific instance descriptor is obtained (301) for the input image using any of the above described methods.

A search of the specific instance descriptor is performed (302) in the image database (e.g., the image database 123 in FIG. 1) where previous scans of various vehicle instances (i.e., candidate reference images) are stored together with their unique instance descriptors associated therewith. The search is used to determine whether the specific vehicle instance in the input image (as represented by the specific instance descriptor) can be found (304) in the database. If the specific instance is found, a first set of images associated with the same specific instance descriptor thus capturing the same vehicle instance are retrieved and used (306) as reference images for comparison with the input image. If the specific instance is not found (or alternatively, if the references found in 306 are insufficient, such as, e.g., too few references, poor scan quality of references, poor perspective of view, etc.), a similarity metric can be used to seek for alternative or additional references (i.e., a second set of images capturing similar vehicle instances).

Specifically, an encoding model can be used (308) to obtain vector representation for each of the input image and candidate reference images. In some embodiments, the encoding model can be based on machine learning. By way of example, the encoding model can be implemented as an encoding deep learning model, such as, e.g., an encoding DNN. The encoding DNN can be deemed as being comprised in the Reference image selection module 104 of PMC 102. The general description of DNN architecture and implementation is described in detail above and thus will not be repeated here for purpose of brevity and conciseness of the description.

A second set of images capturing similar vehicle instances can be selected (310) using a similarity metric between the vector representation of the input image and each candidate reference image. The similarity metric can be any known measure or function that can be used to quantify the similarity between two objects/instances, such as, e.g., any distance functions (e.g., L1-norm, L2-norm, etc.). Specifically, the encoding DNN can be trained and optimized such that the distance between vector representation of all similar instances is smaller than the distance to any non-similar instances.

Due to the above mentioned technical challenges of vehicle image comparison, it can be recognized that the input image can be regarded as acquired by the imaging device at a first imaging condition, and at least one reference image within the set of reference images can be regarded as acquired at a second imaging condition different from the first imaging condition, thereby causing false alarm (FA) difference between the input image and the at least one reference image resulting from difference between the first and second imaging conditions. Therefore, in order to achieve an ideal comparison result, it is needed to identify the DOI while excluding FA differences.

Referring back to the flowchart of FIG. 2, for each given image portion of the plurality of image portions, a best matching reference portion can be searched (205) (e.g., by the reference portion selection module 106 of PMC 102) in the set of reference images. Specifically, a set of reference portion candidates corresponding to the set of reference images can be obtained (206), comprising, for each given reference image within the set, identifying (208) a reference region in the given reference image according to location of the given image portion within the input image, the reference region having a size that is not smaller than the given image portion; using (210) a similarity model on the given image portion and the reference region to obtain a similarity map comprising one or more sections corresponding to one or more reference image portions with one or more respective locations within the reference region, each section in the similarity map indicating a similarity between the given image portion and a respective reference image portion; and selecting (212), from the one or more reference image portions, a reference image portion with the best similarity as a reference portion candidate for the given reference image. The operations as described with reference to 208, 210 and 212 are repeated for each reference image in the set, thereby obtaining a set of reference portion candidates. The best matching reference portion from the set of reference portion candidates can be selected (214).

Reference is now made to FIG. 6, illustrating a schematic example of selecting the best matching reference portion for a given image portion in an input image in accordance with certain embodiments of the presently disclosed subject matter.

There are exemplified in FIG. 6 an input image 602 and a given reference image 604 within the set of reference images as selected for the input image. For a given image portion 606 (out of the plurality of image portions as comprised in the input image 602), a reference region 607 in the given reference image 604 can be identified according to the location of the given image portion 606 within the input image (e.g., according to the relative coordinates of the left corner or center position or any other suitable reference points of the given image portion). In the current example, the size of the reference region 607 is shown as larger than the image portion 606 so as to provide a relatively large area to choose a reference image portion from. The image portion 606 and the reference region 607 are provided as input to a similarity model 610 to obtain a similarity map 612.

The similarity map 612 comprises a plurality of sections corresponding to a plurality of reference image portions with respective locations within the reference region 607. Each section in the similarity map 612 indicates a similarity between the given image portion 606 and a respective reference image portion of the plurality of reference image portions in the reference region 607. The plurality of reference image portions can be regarded as being identified from the reference region 607 using a sliding window 608 with a size of the image portion and a certain step size, therefore having different locations within the reference region. For example, a section 614 in the similarity map 612 can correspond to a specific reference image portion 616 and indicate the level of similarity (e.g., illustrated as 0.8 in the figure) between the reference image portion 616 and the given image portion 606. The similarity can be represented by a numerical value within a range of [0, 1], with 1 indicating most similar or identical, and 0 indicating otherwise. It is appreciated that other kinds of representation of similarity and/or ranges can be used in lieu of the above.

Assuming the section 614 has the best similarity in the similarity map, reference image portion 616 is thus selected as the reference portion candidate for the given reference image 604. Similarly, there is one reference portion candidate selected for each of the rest of reference images. The best matching reference portion can be chosen from the set of reference portion candidates to be the one with the best similarity.

It is to be noted that although the similarity map 612 is illustrated as comprising a plurality of sections such as section 614, it is for the purpose of illustration only. The term section herein should not be construed to be limited to a section with a physical area. Other ways of representation of similarity map and sections thereof can be used in lieu of the above, as long as the similarity map can provide one or more similarity indications corresponding to specific reference image portions. By way of example, the similarity map can be implemented as a list or a vector of similarity values (i.e., sections) each linked to a specific image portion in the reference region.

In particular, a similarity model is used for deriving the similarity map. In some embodiments, the similarity model can be based on machine learning. By way of example, the similarity model can be implemented as a similarity deep learning model, such as, e.g., a similarity DNN. The similarity DNN can be deemed as being comprised in the Reference portion selection module 106 of PMC 102. The general description of DNN architecture and implementation is described in detail above, thus will not be repeated here for purpose of brevity and conciseness of the description.

The similarity DNN can be trained using a training dataset comprising a plurality of sets of image portions. These image portions are extracted from sets of densely registered images (i.e., ground truth registration). Each set of image portions is directed to a specific part in the images. A pair of image portions, each from a different image, is provided as input for training the model. The overlap of the two portions, as calculated from the ground truth registration, is the target of the similarity prediction. The similarity model can be trained so as to be able to accurately reflect similarity (by way of e.g., similarity scores) within each input pair.

In some embodiments, in cases where the image portions are input segments corresponding to mechanical components of the vehicle, the above described process with reference to block 205 can still be applied for finding a best matching reference portion for a given segment. In further embodiments, alternative approaches can be used. For instance, in cases where the set of reference images are previously segmented into reference segments corresponding to the mechanical components as comprised therein, the reference region can be selected as a corresponding reference segment (which is basically the same size as the input segment), and the similarity map, as generated in such cases, can reflect how similar the corresponding reference segment is to the input segment. A best matching reference segment can be selected among all the reference segments from the set of reference images according to the similarity thereof.

Referring back to the flowchart of FIG. 2, once the best matching reference portion for each image portion is identified, each given image portion can be compared (216) with the best matching reference portion using a comparison model, giving rise to a difference map corresponding to the given image portion. The difference map can indicate probability of presence of difference of interest (DOI) in the given image portion. The DOI refers to the type of differences that are of the user's interest. In some embodiments, the DOI can be representative of physical change of the vehicle itself, including but not limited to damage such as e.g., scratches, anomalies such as suspected objects, color changes, etc. Accordingly, a plurality of difference maps corresponding to the plurality of image portions of the input image, can be obtained.

In particular, when comparing the given image portion with the corresponding best matching reference portion, a comparison model is used. In some embodiments, the comparison model can be based on machine learning. By way of example, the comparison model can be implemented as a comparison deep learning model, such as, e.g., a comparison DNN. For instance, the comparison DNN can be implemented as a Siamese neutral network. The comparison DNN can be deemed as being comprised in the Comparison module 108 of PMC 102. The general description of DNN architecture and implementation is described in detail above thus will not be repeated here for purpose of brevity and conciseness of the description.

The comparison DNN can be trained using a training dataset comprising a set of image pairs each including a target image and a reference image for which DOI differences are pre-identified. The model is trained so as to be capable of identifying DOI and excluding the FA difference in a difference map generated between each image pair. In some embodiments, target images as provided to the training process can include synthetic simulated images. The simulated images are generated for the purpose of simulating different kinds of DOIs to be embedded in the target images, such as suspected objects, etc., so that the model can be trained to identify such anomalies in runtime.

In some embodiments, the difference map corresponding to the given image portion can indicate portion-wise probability of presence of DOI in the given image portion. By way of example, the portion-wise probability can be represented by a numerical value within a range of [0, 1] for each given image portion, with 1 indicating most likely there is presence of DOI in the given image portion and 0 indicating otherwise. It is appreciated that other kinds of representation of probability and/or ranges can be used in lieu of the above.

In some embodiments, the difference map corresponding to the given image portion can indicate pixel-wise probability of presence of DOI in the given image portion. By way of example, the pixel-wise probability can be represented by a numerical value within a range of [0, 1] for each given pixel in the given image portion, with 1 indicating most likely there is presence of DOI in the given pixel and 0 indicating otherwise. It is appreciated that other kinds of representation of probability and/or ranges can be used in lieu of the above.

Once a plurality of difference maps corresponding to the plurality of image portions of the input image are generated, each difference map of the plurality of difference maps can be either presented to the user (e.g., through the GUI 124) individually, or alternatively, the plurality of difference maps can be combined to a composite difference map indicating probability of presence of DOI in the entire input image, and the composite difference map can be presented to the user. In some embodiments, at least some of the pixels in the composite difference map result from comparisons with different reference images.

For exemplary purpose only, assuming there are five image portions 1-5 as comprised in an input image. After selecting a best matching reference portion for each image portion, each image portion, together with its best matching reference portion, is input into the comparison model, and a corresponding difference map is generated. Therefore, five difference maps will be generated for the five image portions. A composite difference image is generated by combining the five difference maps. Therefore, it is possible that in the composite difference map, pixels of portion 1 result from comparison with a best matching reference portion which is from a first reference, while pixels of portion 2 may result from comparison with a best matching reference portion which is from a second reference, etc.

Figure 5:
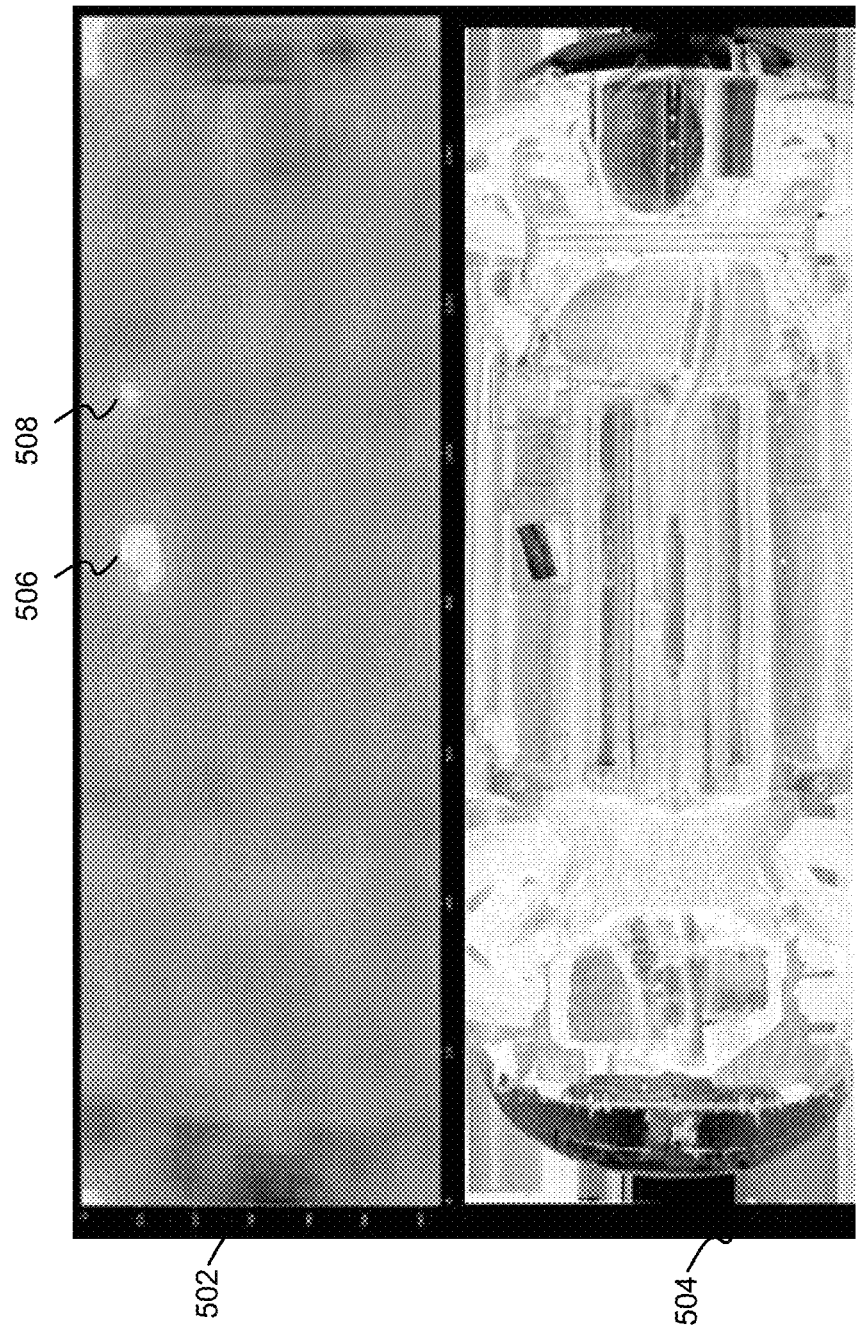
FIG. 5 illustrates an example of a composite difference map and a corresponding input image in accordance with certain embodiments of the presently disclosed subject matter.

FIG. 5 illustrates an example of a composite difference map and a corresponding input image in accordance with certain embodiments of the presently disclosed subject matter.

After an exemplary input image 504 goes through the flow as illustrated in FIG. 2, a plurality of difference maps corresponding to image portions are generated and then combined into a composite difference map 502. As shown, two DOIs 506 and 508 can be identified from the composite difference map which correspond to two suspected objects in the input image (as squared).

It is appreciated that the examples and embodiments illustrated with reference to the comparison in the present description are by no means inclusive of all possible alternatives but are intended to illustrate non-limiting examples only.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer readable memory or storage medium tangibly embodying a program of instructions executable by the computer for executing the method of the invention.

The non-transitory computer readable storage medium causing a processor to carry out aspects of the present invention can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Those skilled in the art will readily appreciate that various modifications and changes can be applied to the embodiments of the invention as hereinbefore described without departing from its scope, defined in and by the appended claims.

The invention claimed is:

1. A computerized method of vehicle image comparison, comprising:
   obtaining an input image acquired by an imaging device capturing at least part of a vehicle, the input image comprising a plurality of image portions;
   retrieving a set of reference images;
   for each given image portion of the plurality of image portions, searching for a best matching reference portion in the set of reference images, comprising:
   i) obtaining a set of reference portion candidates corresponding to the set of reference images, comprising, for each given reference image within the set:
      identifying a reference region in the given reference image according to location of the given image portion within the input image, the reference region having a size that is not smaller than the given image portion;
      using a similarity model on the given image portion and the reference region to obtain a similarity map comprising one or more sections corresponding to one or more reference image portions with one or more respective locations within the reference region, each section in the similarity map indicating a similarity between the given image portion and a respective reference image portion; and
      selecting, from the one or more reference image portions, a reference image portion with the best similarity as a reference portion candidate for the given reference image; and
   ii) selecting the best matching reference portion from the set of reference portion candidates; and
   comparing each given image portion with the best matching reference portion using a comparison model, giving rise to a difference map corresponding to the given image portion, the difference map indicating probability of presence of difference of interest (DOI) in the given image portion, thereby obtaining a plurality of difference maps corresponding to the plurality of image portions of the input image.

2. The computerized method of claim 1, further comprising combining the plurality of difference maps to a composite difference map indicating probability of presence of difference of interest (DOI) in the input image.

3. The computerized method of claim 2, wherein at least some of pixels in the composite difference map result from comparisons with different reference images.

4. The computerized method of claim 1, wherein the plurality of image portions are obtained using a sliding window.

5. The computerized method of claim 1, wherein the plurality of image portions are obtained by segmenting the input image into one or more input segments corresponding to one or more mechanical components comprised in the at least part of the vehicle using a segmentation model.

6. The computerized method of claim 1, wherein the input image is acquired by the imaging device at a first imaging condition, and wherein at least one reference image within the set of reference images is acquired at a second imaging condition different from the first imaging condition, thereby causing false alarm (FA) difference between the input image and the at least one reference image resulting from difference between the first and second imaging conditions.

7. The computerized method of claim 6, wherein the first and second imaging conditions comprise one or more of the following: relative position between the vehicle and the imaging device, illumination condition, and speed of the vehicle.

8. The computerized method of claim 1, wherein the set of reference images are retrieved using an instance descriptor uniquely identifying the vehicle in the input image.

9. The computerized method of claim 8, wherein the set of reference images are selected from a group comprising: a first set of images capturing the same instance of the vehicle, and a second set of images capturing similar instances of the vehicle.

10. The computerized method of claim 9, wherein the second set of images are selected by: using an encoding model to obtain vector representation for each of the input image and candidate reference images, and selecting the second set of images using a similarity metric between the vector representation of the input image and each candidate reference image.

11. The computerized method of claim 1, wherein the comparison model is a comparison deep learning model trained using a training dataset comprising a set of image pairs each including a target image and a reference image so as to be capable of identifying the DOI and excluding the FA difference in a difference map between each image pair.

12. The computerized method of claim 1, wherein the similarity model is a similarity deep learning model trained using training data comprising a plurality of sets of image portions extracted from registered images, and the similarity model is trained so as to reflect similarity within each pair of image portions within each set of the plurality of sets of image portions.

13. The computerized method of claim 1, wherein the segmentation model is a segmentation deep learning model trained using a training dataset comprising a set of pre-segmented vehicle images according to mechanical components comprised therein.

14. The computerized method of claim 1, wherein the difference map corresponding to the given image portion indicates portion-wise probability of presence of DOI in the given image portion.

15. The computerized method of claim 1, wherein the difference map corresponding to the given image portion indicates pixel-wise probability of presence of DOI in the given image portion.

16. A computerized system of vehicle image comparison, the system comprising a processor and memory circuitry (PMC) operatively connected to an I/O interface, wherein:
the I/O interface is configured to:
obtain an input image acquired by an imaging device capturing at least part of a vehicle, the input image comprising a plurality of image portions; and
retrieve a set of reference images; and
the PMC is configured to:
for each given image portion of the plurality of image portions, search for a best matching reference portion in the set of reference images, comprising:
i) obtaining a set of reference portion candidates corresponding to the set of reference images, comprising, for each given reference image within the set:
identifying a reference region in the given reference image according to location of the given image portion within the input image, the reference region having a size that is not smaller than the given image portion;
using a similarity model on the given image portion and the reference region to obtain a similarity map comprising one or more sections corresponding to one or more reference image portions with one or more respective locations within the reference region, each section in the similarity map indicating a similarity between the given image portion and a respective reference image portion; and
selecting, from the one or more reference image portions, a reference image portion with the best similarity as a reference portion candidate for the given reference image; and
ii) selecting the best matching reference portion from the set of reference portion candidates; and
compare each given image portion with the best matching reference portion using a comparison model, giving rise to a difference map corresponding to the given image portion, the difference map indicating probability of presence of difference of interest (DOI) in the given image portion, thereby obtaining a plurality of difference maps corresponding to the plurality of image portions of the input image.

17. The computerized system of claim 16, wherein the PMC is further configured to combine the plurality of difference maps to a composite difference map indicating probability of presence of difference of interest (DOI) in the input image.

18. The computerized system of claim 17, wherein at least some of pixels in the composite difference map result from comparisons with different reference images.

19. The computerized system of claim 16, wherein the plurality of image portions are obtained using a sliding window.

20. The computerized system of claim 16, wherein the plurality of image portions are obtained by segmenting the input image into one or more input segments corresponding to one or more mechanical components comprised in the at least part of the vehicle using a segmentation model.

21. The computerized system of claim 16, wherein the input image is acquired by the imaging device at a first imaging condition, and wherein at least one reference image within the set of reference images is acquired at a second imaging condition different from the first imaging condition, thereby causing false alarm (FA) difference between the input image and the at least one reference image resulting from difference between the first and second imaging conditions.

22. The computerized system of claim 21, wherein the first and second imaging conditions comprise one or more of the following: relative position between the vehicle and the imaging device, illumination condition, and speed of the vehicle.

23. The computerized system of claim 16, wherein the set of reference images are retrieved using an instance descriptor uniquely identifying the vehicle in the input image.

24. The computerized system of claim 23, wherein the set of reference images are selected from a group comprising: a first set of images capturing the same instance of the vehicle, and a second set of images capturing similar instances of the vehicle.

25. The computerized system of claim 24, wherein the second set of images are selected by: using an encoding model to obtain vector representation for each of the input image and candidate reference images, and selecting the second set of images using a similarity metric between the vector representation of the input image and each candidate reference image.

26. The computerized system of claim 16, wherein the comparison model is a comparison deep learning model trained using a training dataset comprising a set of image pairs each including a target image and a reference image so as to be capable of identifying the DOI and excluding the FA difference in a difference map between each image pair.

27. The computerized system of claim 16, wherein the similarity model is a similarity deep learning model trained using a training dataset comprising a plurality of sets of image portions extracted from registered images, and the similarity model is trained so as to reflect similarity within each pair of image portions within each set of the plurality of sets of image portions.

28. The computerized system of claim 16, wherein the segmentation model is a segmentation deep learning model trained using a training dataset comprising a set of pre-segmented vehicle images according to mechanical components comprised therein.

29. The computerized system of claim 16, wherein the difference map corresponding to the given image portion indicates portion-wise probability of presence of DOI in the given image portion.

30. The computerized system of claim 16, wherein the difference map corresponding to the given image portion indicates pixel-wise probability of presence of DOI in the given image portion.

31. A non-transitory computer readable medium comprising instructions that, when executed by a computer, cause the computer to perform a method of vehicle image comparison, the method comprising:
  obtaining an input image acquired by an imaging device capturing at least part of a vehicle, the input image comprising a plurality of image portions;
  retrieving a set of reference images;
  for each given image portion of the plurality of image portions, searching for a best matching reference portion in the set of reference images, comprising:
    i) obtaining a set of reference portion candidates corresponding to the set of reference images, comprising, for each given reference image within the set:
      identifying a reference region in the given reference image according to location of the given image portion within the input image, the reference region having a size that is not smaller than the given image portion;
      using a similarity model on the given image portion and the reference region to obtain a similarity map comprising one or more sections corresponding to one or more reference image portions with one or more respective locations within the reference region, each section in the similarity map indicating a similarity between the given image portion and a respective reference image portion; and
      selecting, from the one or more reference image portions, a reference image portion with the best similarity as a reference portion candidate for the given reference image; and
    ii) selecting the best matching reference portion from the set of reference portion candidates; and
  comparing each given image portion with the best matching reference portion using a comparison model, giving rise to a difference map corresponding to the given image portion, the difference map indicating probability of presence of difference of interest (DOI) in the given image portion, thereby obtaining a plurality of difference maps corresponding to the plurality of image portions of the input image.

* * * * *